June 28, 1960   R. V. KLEINSCHMIDT   2,942,657
VAPOR COMPRESSION EVAPORATION
Filed May 28, 1957   2 Sheets-Sheet 1

INVENTOR.
ROBERT V. KLEINSCHMIDT
BY
ATTORNEYS

June 28, 1960  R. V. KLEINSCHMIDT  2,942,657
VAPOR COMPRESSION EVAPORATION
Filed May 28, 1957  2 Sheets-Sheet 2

INVENTOR.
ROBERT V. KLEINSCHMIDT
BY
ATTORNEYS

United States Patent Office
2,942,657
Patented June 28, 1960

2,942,657

VAPOR COMPRESSION EVAPORATION

Robert V. Kleinschmidt, Stoneham, Mass., assignor to The Bowen Corporation, Cambridge, Mass., a corporation of Massachusetts Filed May 28, 1957, Ser. No. 662,285

3 Claims. (Cl. 159—47)

This invention relates to processes of increasing the solute concentration of solutions by vapor compression evaporation and provides a novel continuous process of vapor compression evaporation of greatly increased efficiency.

Vapor compression evaporation is known as an extremely efficient means of separating solvent from a solution. A typical process and apparatus for practicing it are described in detail in my U.S. Patent No. 2,185,595. In general, the process utilizes the mechanical work of compressing the vapor removed from the solution as the source of energy to effect further evaporation. In a typical operation the solution is maintained in an evaporation zone from which vapor of solvent is removed. This vapor is compressed to an elevated pressure, whereby its temperature is increased, and is then brought into out-of-contact heat exchange relation with the body of solution in the evaporation zone. Because of its elevated pressure, the vapor may be condensed at a temperature above the boiling point of the solution in the evaporation zone, and the heat of evaporation may be utilized to effect further evaporation. The process may thus be maintained continuously by utilizing the energy of compression as the equivalent heat source. By transferring the sensible heat of the effluent streams of both condensed evaporate and concentrated effluent to the incoming solution, the total energy input relative to the amount of solvent removed from the solution may be maintained at an extremely low level.

It is of course necessary to such a process that the solvent vapor be compressed sufficiently to elevate its condensation temperature to above the boiling point of the solution. Where the solution is of high solute concentration the vapor must be more highly compressed than when evaporation is effected from a solution of lower concentration.

When vapor compression evaporation is carried out as a continuous process the product is continuously withdrawn from the body of evaporating solution. That solution and the product must both therefore be maintained at substantially the same concentration. This fact has heretofore limited the advantages of vapor compression processes to cases where product of low concentration is desired.

Where a final solution of high concentration is desired its boiling point is generally so much higher than the boiling point of the pure solvent that the mechanical work of compressing the solvent vapor sufficiently to elevate its condensation temperature to above the boiling point of the solution is excessive. Accordingly, prior art processes of vapor compression evaporations have not proved successful where a highly concentrated product is to be produced.

I have however discovered that such a large energy input is not necessary to produce a high degree of concentration. The object of this invention is to provide a continuous process of vapor compression evaporation which requires only a fraction of the energy input of those processes as practiced in the past.

According to my present invention the evaporation process is carried out in stages in each of which only a fraction of total amount of solvent is removed. As a result, in each stage prior to the last one the concentration and boiling point of the solution are maintained lower than the concentration and boiling point of the final product. Consequently the amount of vapor removed in each stage of the process prior to the last one is compressed to a lesser extent than it would be if all the vapor were removed in one step. The bulk of solvent is accordingly removed from a solution boiling at a lower temperature than the final temperature, and its vapors need not be so highly compressed. Only in the last stage is the vapor compressed to the extent necessary to elevate the condensation temperature to above the boiling point of the final product, but only a fraction of the total vapor is handled in that stage.

My present invention represents a significant improvement in vapor compression evaporation processes and renders them increasingly useful where product of high solids content is to be produced. One typical application of vapor compression evaporation that is greatly improved by this invention is the recovery of solids from waste sulfite paper liquors, where a product of high solids content is desired.

This invention accordingly features a plurality of evaporation stages through which the solution to be evaporated is flowed continuously from one to the next. In the last stage the solution is maintained at its final concentration while in the preceding stages the concentration is lower. In each stage vapor is withdrawn from the solution and is then compressed and passed in out-of-contact heat exchange relation with the evaporating solution in that stage. Since the flow rates of solution and the rate and degree of compression in each stage are all individually controllable, each stage may be operated substantialy independently of the other stages.

In its preferred embodiment the stages are controlled so that the energy input to each one is the same, that is to say, that the product of the amount of solvent times the pressure increase is the same for each stage.

The invention also features a novel manner of recovering the sensible heat from the effluent condensed evaporate by transferring it to the incoming solution. An efficient heat balance may accordingly be easily maintained.

The invention is described in greater detail below with reference to a presently preferred embodiment which has been selected for purposes of illustration, wherein reference is made to the drawings in which.

Figure 3:
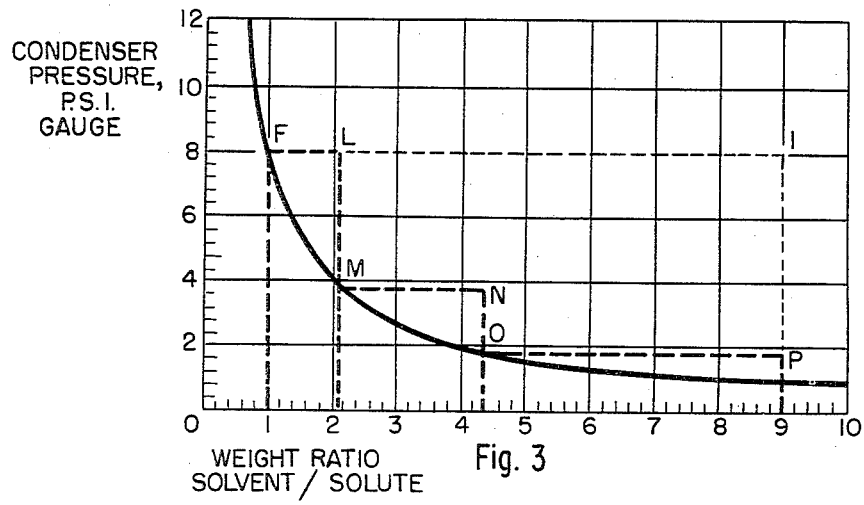
Figure 4:
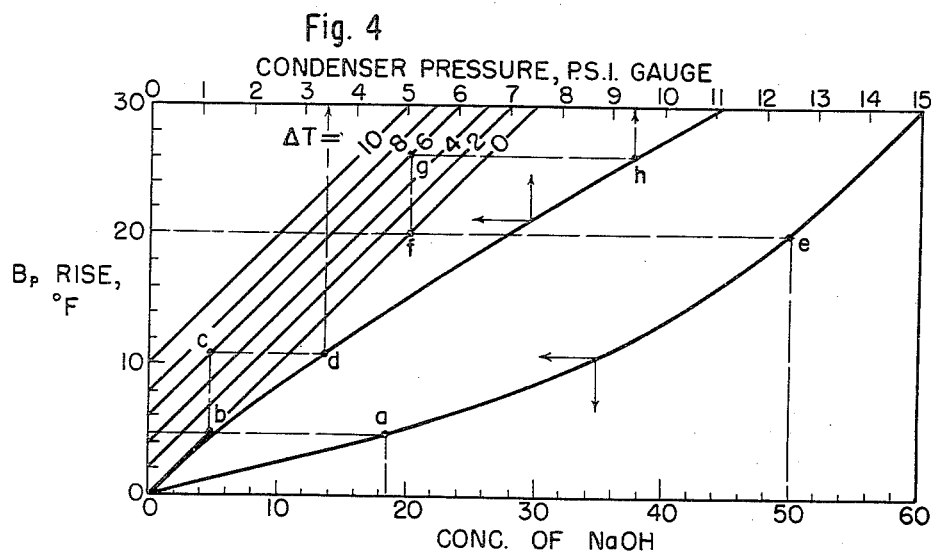

Fig. 3 is a graphical presentation of the work input required to effect a given degree of concentration in which a single stage process is compared with a three-stage process; and Fig. 4 is a graph correlating boiling point rise with concentration of a sodium hydroxide solution, showing also the degree of compression required to utilize the compressed vapor as the heat source at various thermal potentials (temperature difference between condensing compressed vapor and boiling liquid).

Figure 1:
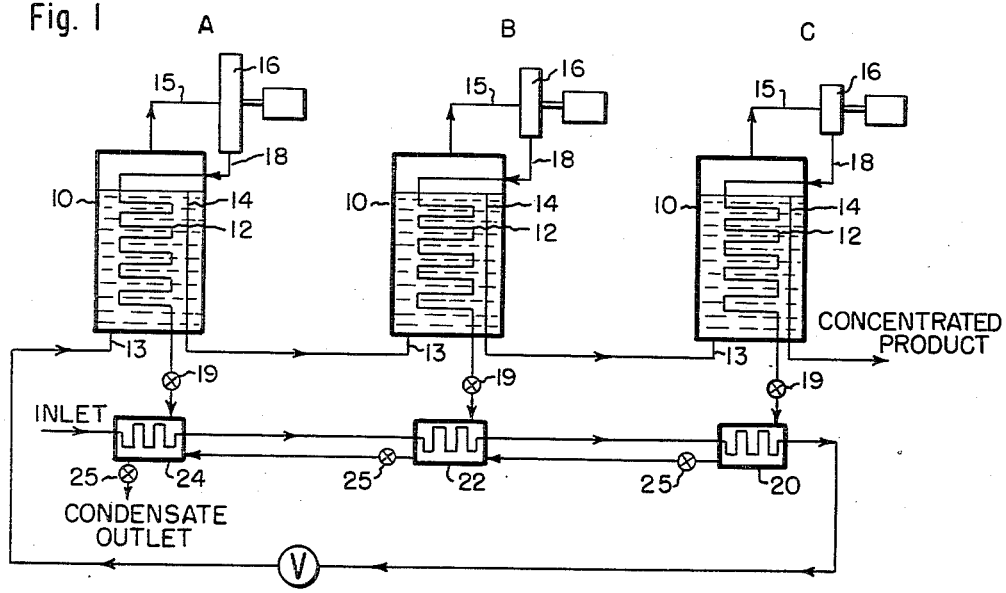
Fig. 1 shows schematically a three stage vapor compression evaporator embodying this invention.

A typical system for carrying out this invention, utilizing three stages of vapor compression evaporation, is shown schematically in Fig. 1. The system is one which may, for example, be used to concentrate waste soda base black liquor from a paper pulp mill.

The system consists of three separate evaporator-condenser stages which are designated generally as A, B and C. Each stage comprises an evaporator-condenser unit in the general form of an evaporator vessel 10 containing a condenser 12 by which hot vapor may be brought into out-of-contact heat exchange relation with solution in the evaporator. Each evaporator 10 has a solution inlet 13 at its lower end and an overflow outlet pipe 14 draining from the upper surface of the solution and maintaining a substantially constant solution level inside the evaporator. A vapor line 15 leads from the top of the evaporator 10 to the inlet of a compressor 16 and a compressed vapor line 18 leads from the outlet of the compressor to the inlet of the condenser 12. The outlet from each condenser 12 connects through a valve 19 with one of a series preheater exchangers. The condensate from the last unit C enters an exchanger 20, the condensate from the intermediate unit B, together with the effluent condensate from the exchanger 20, enters an exchanger 22, and the condensate from the first unit A, together with the effluent condensate from the exchanger 22, enters an exchanger 24. The effluent condensate from each of the exchangers 20, 22 and 24 discharges through a pressure valve 25 by which the pressure of the condensate may be maintained sufficiently high to prevent flashing. All the condensate is discharged from the exchanger 24.

The solution to be concentrated is first preheated to near or above its boiling point by passing it in series through the exchangers 24, 22 and 20, in out-of-contact heat exchange relation with increasingly hotter condensate, and is then fed into the evaporator-condenser unit A. The overflow from unit A is fed to unit B and the overflow from unit B is fed to the final concentration unit C, from which product is withdrawn.

In each of the units solvent is removed by operation of the vapor pumps 16. Vapor is compressed in the pumps until its condensation temperature is above the boiling point of the solution in the evaporator by the desired thermal potential. When so compressed the vapor is superheated as it leaves the pump. The vapor is discharged into the condensers 12 and is there condensed by the transfer of its heat to the evaporating solution. This transfer results in the generation of additional vapor which in turn is compressed and fed to the condenser.

In each successive unit the solution is maintained at a concentration greater than that in the next preceding unit, and consequently at a correspondingly higher temperature. As a result, the pressure in the condenser of each unit must be greater than in the preceding unit in order that the condensation temperature is correspondingly higher, and the condensate temperature from each unit is higher than in the preceding unit. Preheating of the fresh solution in the manner described utilizes the ever increasing condensate temperature by progressively bringing the fresh solution into heat exchange relation with increasingly hot fluid in a manner such that the fresh solution is preheated very nearly to its boiling point, or in many cases to above its boiling point.

Because of the efficient recovery of the sensible heat in the condensate, a very favorable heat balance may be maintained and the process sustained by the energy of compression supplied to the compressors 16.

In each unit, the solution is maintained at a concentration selected to achieve the desire final concentration with a minimum total energy input, and this concentration is maintained by so controlling the compressor 16 to remove the requisite amount of solvent. Minimum total energy input is achieved when the energy input to each of the several stages is equal, and in general this condition is achieved when each successive stage is operated to remove less solvent than the preceding stage. Since each successive stage requires an increased degree of compression, equality of energy input may be achieved even though less solvent is pumped.

Figure 2:
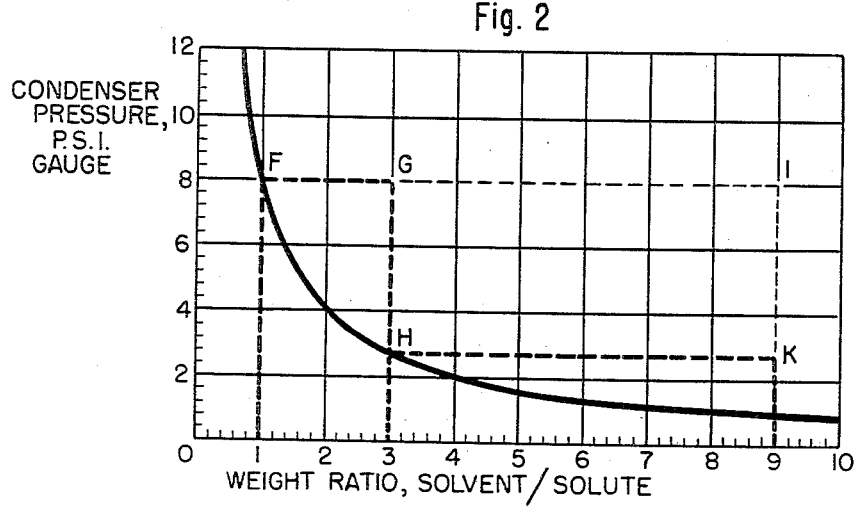
Fig. 2 is a graphical presentation of the work input required to effect a given degree of concentration in which a single stage process is compared with a two-stage process.

Optimum operative conditions for any given operation can be shown graphically, as in Figs. 2 and 3 which illustrate a 2 and 3-stage evaporation process respectively by correlating condenser pressure necessary to achieve a condensation temperature above the boiling point of the solution with the concentration of the solution expressed as the weight ratio of solvent to dissolved solids. On such a graph, horizontal distance represents the weight of solvent removed from a unit weight of solute between any given concentration limits, and vertical distance at the high concentration limit represents the amount by which the vapors of solvent must be compressed if they are to be used effectively as the heat source for a boiling solution of that concentration.

Fig. 2 may be taken as representative of a typical operation, such as the evaporation of waste soda base black liquor, to illustrate the amount of work required to concentrate the solution from an initial concentration of 10% solute to a final concentration of 50% solute. These limits correspond to an initial ratio of solvent-to-solute of 9 and a final ratio of solvent-to-solute of 1, and the removal of 8 parts by weight of solvent per part of solute. The final evaporator condenser must be operated with the solution in it at the final concentration and the temperature in that unit must correspond to the boiling point of the final solution. The vapor in the final unit must accordingly be compressed to about 8 p.s.i.'s, as indicated on the graph of Fig. 2 at the concentration of the final solution. When all of the concentration is effected in a single unit the entire 8 units of solvent removed for each unit of solute must in the illustrated system be compressed to a pressure of 8 pounds per square inch, this amount of work being represented by the area beneath the line FI.

This invention is based on the discovery that if the concentration is carried out in two or more stages the bulk of the solvent may be removed with considerably less work. Again referring to Fig. 2, if 6 units of solvent are removed in the first stage to bring the solute concentration to 25 parts by weight (solvent-to-solute ratio of 3) the vapor initially removed need be compressed to only about 2.7 pounds per square inch, and in the final stage it is necessary to compress only 2 units of vapor to the 8 pounds per square inch necessary to operate that stage. With the 2-stage operation the total of work may be represented by the area under the line FG plus the area under the line HK; the amount of work represented by the area GHKI is saved.

Still further savings may be effected by further increasing the number of stages, as suggested by Fig. 3 in which a 3-stage operation is compared with a single-stage operation. In this case the total work is shown by the area under the line FL plus the area under MN plus the area OP, and the work saved is represented by the area LMNOPI.

Optimum operating conditions in the process of this invention are achieved if the total concentration effected by any two units is shared such that both units perform the same amount of work. I have found that approximately equal division of the work will be achieved if between any two stages the concentration of the effluent of the first of these two stages is equal to the square root of the product of the initial concentration of the feed to the first stage times the final concentration of the effluent from the second stage, each expressed as the weight ratio of solvent to solute. Thus in the above example optimum operation is achieved in the 2-stage system when the concentration of the product in the first unit is 3 parts of solvent per part of solute, or a weight concentration of solute of 25%. The same relationship also applies to any two adjacent stages of a 3-stage system. The overall division is achieved when the first stage is operated to yield a solution having a concentration represented by the formula:

$$X_1 = (X_i^2 X_f)^{1/3}$$

The concentration of the solution from the second stage of the 3-stage system may be expressed by the formula:

$$X_2 = (X_f^2 X_i)^{1/3}$$

where:

$X_1$ equals the concentration of solution from the first unit, $X_2$ represents the concentration of solution from the second unit, $X_i$ represents the initial concentration of solution, and $X_f$ represents the final concentration of solution achieved in the final unit, as weight ratio of solvent-to-solute.

As a generalization for a unit having $n$ stages the following formulae are applicable:

$$X_1 = (X_i^{n-1} X_f)^{1/n}$$
$$X_{n-1} = (X_f^{n-1} X_i)^{1/n}$$
$$X_2 = (X_i^{n-2} X_f^2)^{1/n}$$

etc.

In Fig. 4 the boiling point rise is plotted as a function of concentration of a sodium hydroxide solution, and condenser pressure is shown correlated with boiling point. This graphical presentation is useful in selecting operating conditions for a multi-stage vapor compression evaporation of this particular solution between any desired concentration limits. To assist in the graphical analysis a number of lines of unit slope spaced apart by a distance corresponding to a temperature difference of 2° F. are plotted so that the pressure rise necessary to attain a condensation temperature any desired thermal potential above the boiling point of the solution may be easily selected at any desired product concentration.

To establish operating conditions in evaporating a sodium hydroxide solution in accordance with this invention, the concentration of the solution in each of the stages may be selected for near optimum operation from the formulae above. From the concentration, the boiling point rise over that of pure solvent may then be determined from the lower graph of Fig. 4, which correlates boiling point rise with concentration. The amount of compression of the vapor necessary to attain a condensation temperature equal to the boiling point may now be obtained at the intersection of the upper graph of Fig. 4, which correlates boiling point rise with pressure rise, and a line through the operating point and parallel with the abscissa. With the aid of the parallel unit slope lines, a vertical distance corresponding to any desired thermal potential may be measured; a corresponding pressure rise to attain that potential may then be read from the upper graph.

Operating conditions in the two-stage concentration of a 5 percent by weight sodium hydroxide solution to a concentration of 50 percent by weight, with each stage operating under a thermal potential of 6 Fahrenheit degrees, may be determined as follows:

(1) Concentration of product in first stage:

$X_i = 19$ parts solvent to solute
$X_f = 1$ part solvent to solute
$X_1 = (19 \times 1)^{1/2} = 4.36 = 18.6\%$ (2) Boiling point rise, first stage:

From Fig. 4, at point $a = 4.7°$ F.

(3) Pressure rise in first stage to attain a thermal potential of 6° F.:

$bc$ represents $\Delta T = 6$
$d$ represents corresponding pressure rise $= 3.5$ p.s.i.

(4) Boiling point rise, second stage:

From Fig. 4, at point $e = 20°$ F.

(5) Pressure rise in second stage to attain a thermal potential of 6° F.:

$fg$ represents $\Delta T = 6$
$h$ represents corresponding pressure rise $= 9.4$ p.s.i.

According to this invention therefore two-stage evaporation of a sodium hydroxide solution requires that the 14.64 parts of solvent per part of sodium hydroxide removed in the first stage be compressed 3.5 p.s.i. In the second stage only the remaining 3.36 parts of solvent are compressed 9.4 p.s.i. In a single stage of vapor compression evaporation, on the other hand, the entire 18 parts of solvent would have to be compressed the full 9.4 p.s.i. necessary to attain a thermal potential of 6 Fahrenheit degrees.

This invention has been described with specific reference to its preferred embodiment, but it is contemplated that modifications will readily occur to those skilled in the art, and that such may be made without departing from the scope of this invention.

Having thus disclosed my invention and described in detail representative examples of its preferred embodiments, I claim and desire to secure by Letters Patent:

1. The continuous method of increasing the concentration of solute in a solution from an initial concentration to an elevated concentration by evaporating volatile solvent from said solution comprising continuously flowing said solution of initial concentration initially in succession through a first heat exchanger and through a second heat exchanger and then through a first evaporation zone and continuously withdrawing a first fraction of vapor from said solution in said first evaporation zone, said flowing and withdrawing being at rates correlated to maintain the solution in said first evaporation zone at an intermediate concentration, mechanically compressing said vapor to elevate its condensation temperature to above the boiling point of said solution of intermediate concentration, passing said compressed vapor in out-of-contact heat exchange relation with said solution of intermediate concentration in said first evaporation zone and causing said compressed vapor to condense therein to form a first fraction of condensate and flowing said first fraction of condensate through said first heat exchanger in out-of-contact heat exchange relation with said solution of initial concentration to preheat same, continuously flowing said solution of intermediate concentration through a second evaporation zone and continuously withdrawing a second fraction of vapor from said solution in said second evaporation zone, said flowing and withdrawing being at rates correlated to maintain the solution in said second evaporation zone in said elevated concentration, mechanically compressing said second fraction of vapor to elevate its condensation temperature to above the boiling point of said solution of elevated concentration, passing said compressed second fraction of vapor in out-of-contact heat exchange relation with said solution of elevated concentration in said second evaporation zone and causing said second fraction of vapor to condense therein to form a second fraction of condensate and flowing said second fraction of condensate through said second heat exchanger in out-of-contact heat exchange relation with said preheated solution of initial concentration, and finally removing said solution of elevated concentration from said second evaporation zone.

2. In the continuous method of increasing the concentration of solute in a solution from an initial concentration to an elevated concentration by evaporating volatile solvent from said solution and comprising continuously flowing said solution of initial concentration through a first evaporation zone and continuously withdrawing a first fraction of vapor from said solution in said first evaporation zone, said flowing and withdrawing being at rates correlated to maintain the solution in said first evaporation zone at an intermediate concentration, mechanically compressing said vapor to elevate its condensation temperature to above the boiling point of said solution of intermediate concentration, passing said compressed vapor in out-of-contact heat exchange relation with said solution of intermediate concentration in said first evaporation zone and causing said compressed vapor to condense therein, continuously flowing said solution of intermediate concentration through a second evaporation zone and continuously withdrawing a second fraction of vapor from said solution in said second evaporation zone, said flowing and withdrawing being at rates correlated to maintain the solution in said second evaporation zone at said elevated concentration, mechanically compressing said second fraction of vapor to elevate its condensation temperature to above the boiling point of said solution of elevated concentration, passing said compressed second fraction of vapor in out-of-contact heat exchange relation with said solution of elevated concentration in said second evaporation zone and causing said second fraction of vapor to condense therein, and finally removing said solution of elevated concentration from said second evaporation zone: controlling the amount of said withdrawal of said first fraction of vapor relative to the amount of said withdrawal of said second fraction of vapor such as to maintain the intermediate concentration expressed in terms of the weight ratio of solvent-to-solute about equal to the square root of the product of the intial concentration times the final concentration, each also being expressed in terms of the weight ratio of solvent-to-solute.

3. The method defined by claim 2 wherein the mechanical energy utilized in compressing said second fraction of vapor is maintained about equal to the amount of energy utilized in compressing said first fraction of vapor.

References Cited in the file of this patent

UNITED STATES PATENTS

| | | |
|---|---|---|
| 1,318,793 | Newhall | Oct. 14, 1919 |
| 1,944,548 | Ebner | Jan. 23, 1934 |
| 2,459,302 | Aronson | Jan. 18, 1949 |
| 2,651,356 | Sadtler | Sept. 8, 1953 |
| 2,734,565 | Lockman | Feb. 14, 1956 |

FOREIGN PATENTS

| | | |
|---|---|---|
| 246,807 | Great Britain | Dec. 10, 1925 |

OTHER REFERENCES

Heat Transfer and Evaporation, W. L. Badger, published by The Chemical Catalog Co., Inc. NYC. in 1926. Pages 155, 263–266.

"Evaporation" by Webre and Robinson, pub. by Chemical Catalog Co., Inc. NYC. in 1926, page 289.